United States Patent
Gigie et al.

(10) Patent No.: US 12,354,234 B2
(45) Date of Patent: Jul. 8, 2025

(54) METHOD AND SYSTEM FOR MULTI-MODAL IMAGE SUPER-RESOLUTION

(71) Applicant: Tata Consultancy Services Limited, Mumbai (IN)

(72) Inventors: Andrew Gigie, Bangalore (IN); Achanna Anil Kumar, Bangalore (IN); Kriti Kumar, Bangalore (IN); Mariswamy Girish Chandra, Bangalore (IN); Angshul Majumdar, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 445 days.

(21) Appl. No.: 17/825,256

(22) Filed: May 26, 2022

(65) Prior Publication Data

US 2023/0013631 A1 Jan. 19, 2023

(30) Foreign Application Priority Data

May 26, 2021 (IN) .............................. 202121023491

(51) Int. Cl.
*G06T 3/4053* (2024.01)
*G06T 3/4084* (2024.01)
(52) U.S. Cl.
CPC .......... *G06T 3/4053* (2013.01); *G06T 3/4084* (2013.01)
(58) Field of Classification Search
CPC ........................... G06T 3/4053; G06T 3/4084
See application file for complete search history.

(56) References Cited

U.S. PATENT DOCUMENTS

| 9,734,601 B2* | 8/2017 | Bresler | G06T 11/006 |
| 10,648,924 B2* | 5/2020 | Zhang | G06F 18/2414 |
| 2020/0211159 A1* | 7/2020 | Migukin | G06T 3/4053 |

OTHER PUBLICATIONS

Deng et al., "Deep Coupled ISTA Network for Multi-modal Image Super-Resolution," (2019).
Marivani et al., "Multimodal Image Super-resolution via Deep Unfolding with Side Information," (2019).
Marivani et al., "Multimodal Deep Unfolding for Guided Image Super-Resolution," (2020).

\* cited by examiner

*Primary Examiner* — Nancy Bitar
*Assistant Examiner* — Dustin Bilodeau
(74) *Attorney, Agent, or Firm* — FINNEGAN, HENDERSON, FARABOW, GARRETT & DUNNER LLP

(57) ABSTRACT

This disclosure relates generally to a method and system for multi-modal image super-resolution. Conventional methods for multi-modal image super-resolution are performed using joint image based filtering, deep learning and dictionary based approaches which require large datasets for training. Embodiments of the present disclosure provide a joint optimization based transform learning framework wherein a high-resolution (HR) image of target modality is reconstructed from a HR image of guidance modality and a low-resolution (LR) image of target modality. A set of parameters, transforms, coefficients and weight matrices are learnt jointly from a training data which includes a HR image of guidance modality, a LR image of target modality and a HR image of target modality. The learnt set of parameters are used for reconstructing a HR image of target modality. The disclosed joint optimization transform learning framework is used in remote sensing, environment monitoring and so on.

17 Claims, 10 Drawing Sheets

METHOD AND SYSTEM FOR MULTI-MODAL IMAGE SUPER-RESOLUTION

PRIORITY CLAIM

This U.S. patent application claims priority under 35 U.S.C. § 119 to: Indian Patent Application No. 202121023491, filed on May 26, 2021. The entire contents of the aforementioned application are incorporated herein by reference.

TECHNICAL FIELD

The disclosure herein generally relates to the field of multi-modal imaging and more particularly, to a method and system for multi-modal image super-resolution.

BACKGROUND

In many practical applications such as remote sensing, seed viability studies, environment monitoring, food processing, medical field and forensic studies, information from the scene of interest is often captured using different imaging modalities such as RGB image, Near-Infrared (NIR)/multi-spectral image leading to multimodal imaging system. Although such systems capture enriched source of information of the scene of interest, limitations such as cost, design complexity and data storage have been major restricting factors. For example, in remote sensing, the satellite imaging systems capture the information in various modalities such as panchromatic (High-resolution (HR)) and multi-spectral bands (Low-resolution (LR)), at different resolutions. This is performed considering the memory constraints, design complexity, communication and processing challenges. Thus, the information from multiple modalities is to be made use to overcome the resolution limitation of the targeted modality.

Traditionally, resolution enhancement has been achieved using unimodal image super-resolution methods. In the recent past, Multimodal Image Super-Resolution (MISR) methods which leverages information from multiple modalities have gained lot of interest. There are several MISR techniques that exist in literature, which can broadly be classified into the following three categories: (i) joint image based filtering, (ii) methods based on deep learning and (iii) dictionary based approaches.

Joint image based filtering techniques such as joint bilateral filtering, guided image filtering, and joint image restoration construct joint filters by considering certain features such as edges and textures from the guidance image. However, these joint filters fail in scenarios when there are disparities between the guidance and target modality. Deep learning architecture employing convolutional neural network (CNN) have also been used for MISR. However, this requires large datasets for its training. Representation learning using coupled dictionary methods have been able to perform better than the deep learning based method for MISR. Separate and common dictionaries are learnt for different modalities with the assumption that the common dictionaries share the same sparse representation. Recently a Joint Multi-modal Dictionary Learning (JMDL) approach for MISR have been proposed, wherein the approach model the cross-modal dependencies as a weighted superposition of individual sparse dictionary coefficients.

SUMMARY

Embodiments of the present disclosure present technological improvements as solutions to one or more of the above-mentioned technical problems recognized by the inventors in conventional systems. For example, in one embodiment, a method for multi-modal image super-resolution is provided. The method includes: receiving a set of training data including (i) a high-resolution image of a first modality (X) (ii) a low-resolution image of a second modality (Y) and (iii) a high-resolution ground truth image of the second modality (Z) represented using a transform learning, wherein the transform learning involving a joint optimization of a set of parameters including: (i) a set of transforms ($T_X$, $T_Y$, $T_Z$) corresponding to the high-resolution image of the first modality, the low-resolution image of the second modality and the high-resolution ground truth image of the second modality respectively, (ii) a set of coefficients ($H_X$, $H_Y$, $H_Z$) corresponding to the high-resolution image of the first modality, the low-resolution image of the second modality and the high-resolution ground truth image of the second modality respectively, and (iii) a set of weight matrices ($W_X$, $W_Y$) corresponding to the high-resolution image of the first modality and the low-resolution image of the second modality respectively; and performing the joint optimization of the set of transforms, the set of coefficients and the set of weight matrices by: randomly initializing the set of transforms, the set of coefficients and the set of weight matrices and performing joint learning iteratively using the randomly initialized set of parameters in a first iteration and a learnt set of parameters obtained from a previous iteration in a current iteration to jointly obtain (i) the learnt set of transforms (ii) the learnt set of coefficients and (iii) the learnt set of weight matrices for the set of training data, until a termination criterion is met, wherein the joint learning comprises: learning the set of transforms from the set of coefficients and the set of training data, learning the set of coefficients from the set of transforms, the set of training data and the set of weight matrices, and learning the set of weight matrices from the set of coefficients wherein the termination criterion is difference between the set of parameters of the current iteration and the set of parameters of the previous iteration being less than an empirically determined threshold value.

In another aspect, a system for multi-modal image super-resolution is provided. The system comprises memory storing instructions; one or more communication interfaces; and one or more hardware processors coupled to the memory via the one or more communication interfaces, wherein the one or more hardware processors are configured by the instructions to receive a set of training data including (i) a high-resolution image of a first modality (X) (ii) a low-resolution image of a second modality (Y) and (iii) a high-resolution ground truth image of the second modality (Z) represented using a transform learning, wherein the transform learning involving a joint optimization of a set of parameters including: (i) a set of transforms ($T_X$, $T_Y$, $T_Z$) corresponding to the high-resolution image of the first modality, the low-resolution image of the second modality and the high-resolution ground truth image of the second modality respectively, (ii) a set of coefficients ($H_X$, $H_Y$, $H_Z$) corresponding to the high-resolution image of the first modality, the low-resolution image of the second modality and the high-resolution ground truth image of the second modality respectively, and (iii) a set of weight matrices ($W_X$, $W_Y$) corresponding to the high-resolution image of the first modality and the low-resolution image of the second modality respectively; and perform the joint optimization of the set of transforms, the set of coefficients and the set of weight matrices by: randomly initializing the set of transforms, the set of coefficients and the set of weight matrices and performing joint learning iteratively using the randomly initialized set of parameters in a first iteration and a learnt set of parameters obtained from a previous iteration in a current iteration to jointly obtain (i) the learnt set of transforms (ii) the learnt set of coefficients and (iii) the learnt set of weight matrices for the set of training data, until a termination criterion is met, wherein the joint learning comprises: learning the set of transforms from the set of coefficients and the set of training data, learning the set of coefficients from the set of transforms, the set of training data and the set of weight matrices, and learning the set of weight matrices from the set of coefficients wherein the termination criterion is difference between the set of parameters of the current iteration and the set of parameters of the previous iteration being less than an empirically determined threshold value.

In an embodiment, wherein the joint optimization is represented as:

$$\min_{T_X, T_Y, T_Z, H_X, H_Y, H_Z, W_X, W_Y} \|T_X X - H_X\|_F^2 +$$
$$\|T_Y Y - H_Y\|_F^2 + \|T_Z Z - H_Z\|_F^2 + \lambda \left( \sum_{K \in X, Y, Z} \|H_K\|_1 \right) +$$
$$\eta \|H_Z - W_X H_X - W_Y H_Y\|_F^2 + \mu \left( \sum_{K \in X, Y, Z} \left( \|T_K\|_F^2 - \text{logdet}(T_K) \right) \right)$$

wherein $\{X, Y, Z\} \in \mathbb{R}^{N \times P}$, $\{H_X, H_Y, H_Z\} \in \mathbb{R}^{N \times P}$, $\{T_X, T_Y, T_Z\} \in \mathbb{R}^{N \times N}$, $W_X, W_Y \in \mathbb{R}^{N \times N}$, $\lambda, \eta, \mu$, are hyperparameters and N×P is the vectorized 2D image patch size.

In an embodiment, wherein the learning of the set of transforms is represented as:

$$\min_{T_X} \|T_X X - H_X\|_F^2 + \mu \left( \|T_X\|_F^2 - \text{logdet}(T_X) \right)$$
$$\min_{T_Y} \|T_Y Y - H_Y\|_F^2 + \mu \left( \|T_Y\|_F^2 - \text{logdet}(T_Y) \right)$$
$$\min_{T_Z} \|T_Z Z - H_Z\|_F^2 + \mu \left( \|T_Z\|_F^2 - \text{logdet}(T_Z) \right)$$

In an embodiment, wherein the learning of the set of coefficients is represented as:

$$\min_{H_X} \|T_X X - H_X\|_F^2 + \lambda \|H_X\|_1 + \eta \|H_Z - W_X H_X - W_Y H_Y\|_F^2$$
$$\min_{H_Y} \|T_Y Y - H_Y\|_F^2 + \lambda \|H_Y\|_1 + \eta \|H_Z - W_X H_X - W_Y H_Y\|_F^2$$
$$\min_{H_Z} \|T_Z Z - H_Z\|_F^2 + \lambda \|H_Z\|_1 + \eta \|H_Z - W_X H_X - W_Y H_Y\|_F^2$$

In an embodiment, wherein the learning of the set of weight matrices is represented as:

$$\min_{W_X} \|H_Z - W_X H_X - W_Y H_Y\|_F^2$$
$$\min_{W_Y} \|H_Z - W_X H_X - W_Y H_Y\|_F^2$$

In an embodiment, further comprising reconstructing a new high-resolution image of the second modality ($Z_{new}$) for a new low-resolution image of the second modality ($Y_{new}$) from a new high-resolution image of the first modality ($X_{new}$), wherein the reconstructing of the high-resolution image of the second modality comprises: receiving the new high-resolution image of first modality and the new low-resolution image of second modality, estimating a new set of coefficients ($H_{X_{new}}$, $H_{Y_{new}}$) using the new high-resolution image of first modality, the new low-resolution image of second modality and the learnt set of transforms ($T_X$, $T_Y$), estimating a new coefficient ($H_{Z_{new}}$) corresponding to the new high-resolution image of second modality using the new set of coefficients and the learnt set of weight matrices and reconstructing the new high-resolution image of second modality based on the new coefficient corresponding to the new high-resolution image of second modality and the learnt set of transforms ($T_Z$) corresponding to the high-resolution ground truth image of second modality.

In an embodiment, wherein estimating the new set of coefficients is represented as:

$$\min_{H_{X_{new}}} \|T_X X_{new} - H_{X_{new}}\|_F^2 + \lambda \|H_{X_{new}}\|_1$$
$$\min_{H_{Y_{new}}} \|T_Y Y_{new} - H_{Y_{new}}\|_F^2 + \lambda \|H_{Y_{new}}\|_1$$

In an embodiment, wherein estimating the new coefficient corresponding to the new high-resolution image of second modality is represented as:

$$H_{Z_{new}} = W_X H_{X_{new}} + W_Y H_{Y_{new}}$$

In an embodiment, wherein reconstructing the new high-resolution image of second modality is represented as:

$$Z_{new} = T_X^\dagger H_{Z_{new}}$$

In yet another aspect, a non-transitory computer readable medium for multi-modal image super-resolution is provided by receiving a set of training data including (i) a high-resolution image of a first modality (X) (ii) a low-resolution image of a second modality (Y) and (iii) a high-resolution ground truth image of the second modality (Z) represented using a transform learning, wherein the transform learning involving a joint optimization of a set of parameters including: (i) a set of transforms ($T_X$, $T_Y$, $T_Z$) corresponding to the high-resolution image of the first modality, the low-resolution image of the second modality and the high-resolution ground truth image of the second modality respectively, (ii) a set of coefficients ($H_X$, $H_Y$, $H_Z$) corresponding to the high-resolution image of the first modality, the low-resolution image of the second modality and the high-resolution ground truth image of the second modality respectively, and (iii) a set of weight matrices ($W_X$, $W_Y$) corresponding to the high-resolution image of the first modality and the low-resolution image of the second modality respectively; and performing the joint optimization of the set of transforms, the set of coefficients and the set of weight matrices by: randomly initializing the set of transforms, the set of coefficients and the set of weight matrices and performing joint learning iteratively using the randomly initialized set of parameters in a first iteration and a learnt set of parameters obtained from a previous iteration in a current iteration to jointly obtain (i) the learnt set of transforms (ii) the learnt set of coefficients and (iii) the learnt set of weight matrices for the set of training data, until a termination criterion is met, wherein the joint learning comprises: learning the set of transforms from the set of coefficients and the set of training data, learning the set of coefficients from the set of transforms, the set of training data and the set of weight matrices, and learning the set of weight matrices from the set of coefficients wherein the termination criterion is difference between the set of parameters of the current iteration and the set of parameters of the previous iteration being less than an empirically determined threshold value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
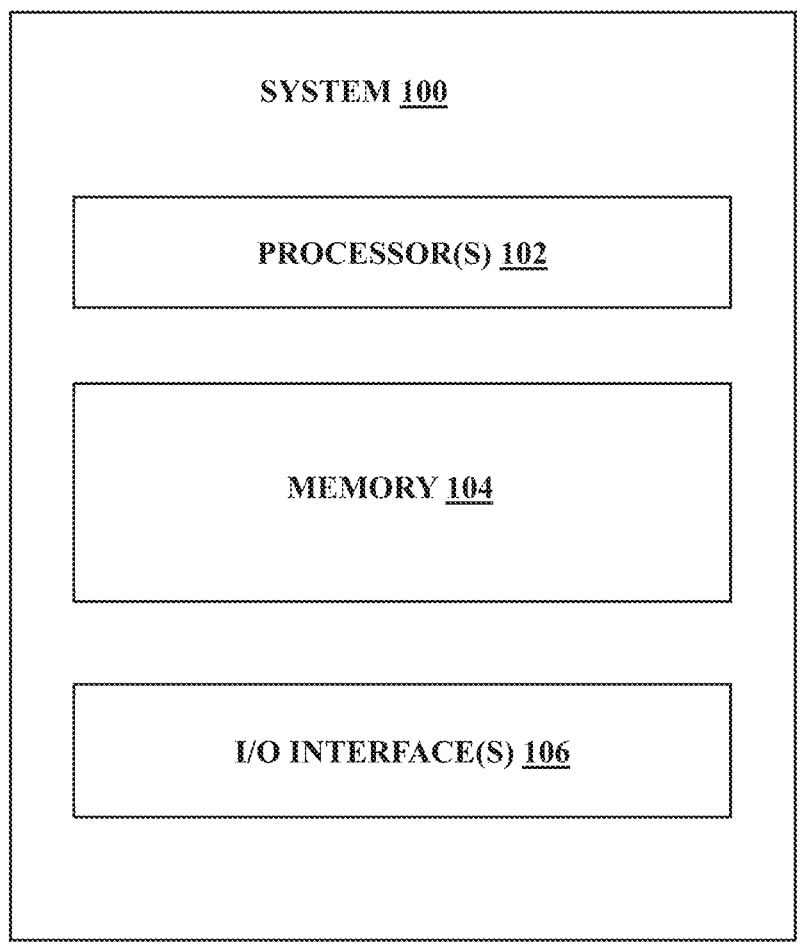
FIG. 1 illustrates an exemplary block diagram of a system for multi-modal image super-resolution, in accordance with some embodiments of the present disclosure

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for multi-modal image super-resolution (MISR). The present disclosure method described herein provides a transform learning based approach for multi-modal image super-resolution (MISR). The disclosed method provides a joint optimization based transform learning framework wherein a high-resolution (HR) image of target modality is reconstructed from an HR image of guidance modality and a low-resolution (LR) image of target modality. During a training phase a set of parameters which includes a set of transforms, a set of coefficients and a set of weight matrices corresponding to a training data are learnt jointly. The training data includes the HR image of guidance modality, an LR image of target modality and an HR image of target modality. In the testing phase an HR image of target modality is reconstructed using a new HR image of guidance modality and a new low-resolution image of target modality using the learnt set of transforms, the learnt set of coefficients and the learnt weight matrices.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrates a system 100 for multi-modal image super-resolution. In an embodiment, the system 100 includes one or more processors 102, communication interface device(s) or input/output (I/O) interface(s) 106, and one or more data storage devices or memory 104 operatively coupled to the one or more processors 102. The memory 104 comprises one or more modules 108. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a module for multi-modal image super-resolution of the system 100 along with a plurality of modules (not shown) to perform the methodology described herein.

Figure 2:
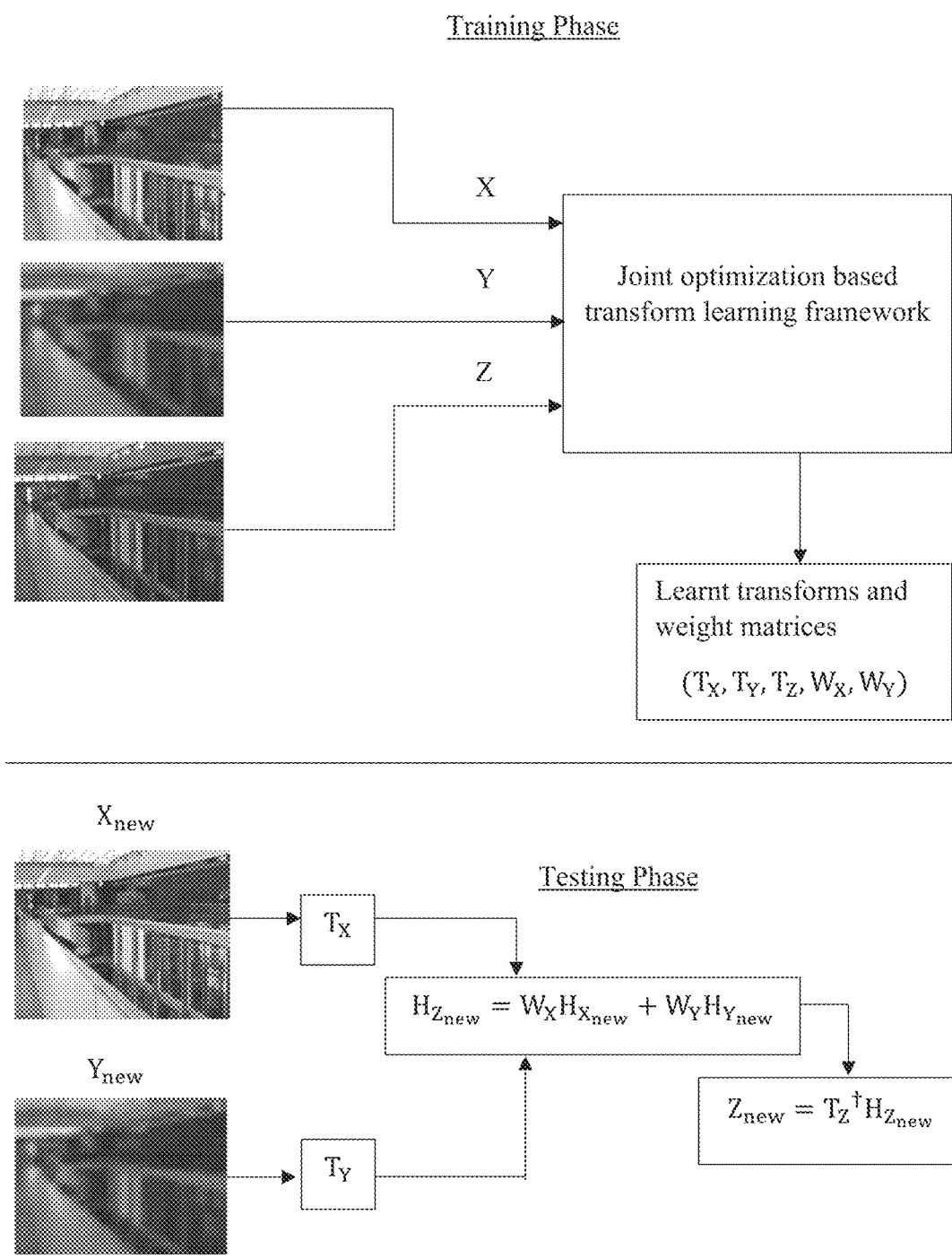
FIG. 2 is an exemplary block diagram illustrating a training phase and a testing phase for multi-modal image super-resolution according to some embodiments of the present disclosure.

FIG. 2 is an exemplary block diagram illustrating the training phase and the testing phase for multi-modal image super-resolution according to some embodiments of the present disclosure. In the training phase for multi-modal image super-resolution, training data includes HR image of guidance modality, LR image of target modality and HR image of target modality. Based on joint optimization transform learning approach using the training data a set of transforms, a set of coefficients and weight matrices are jointly learnt. During the testing phase, a new HR image of guidance modality and a new LR image of target modality is provided to the transform learning framework. A new coefficient corresponding to a new HR image of target modality using a new set of coefficients estimated corresponding to the new HR image of guidance modality and the new LR image of target modality. The new HR image of target is reconstructed from its new coefficient and learnt transform.

Figure 3A:
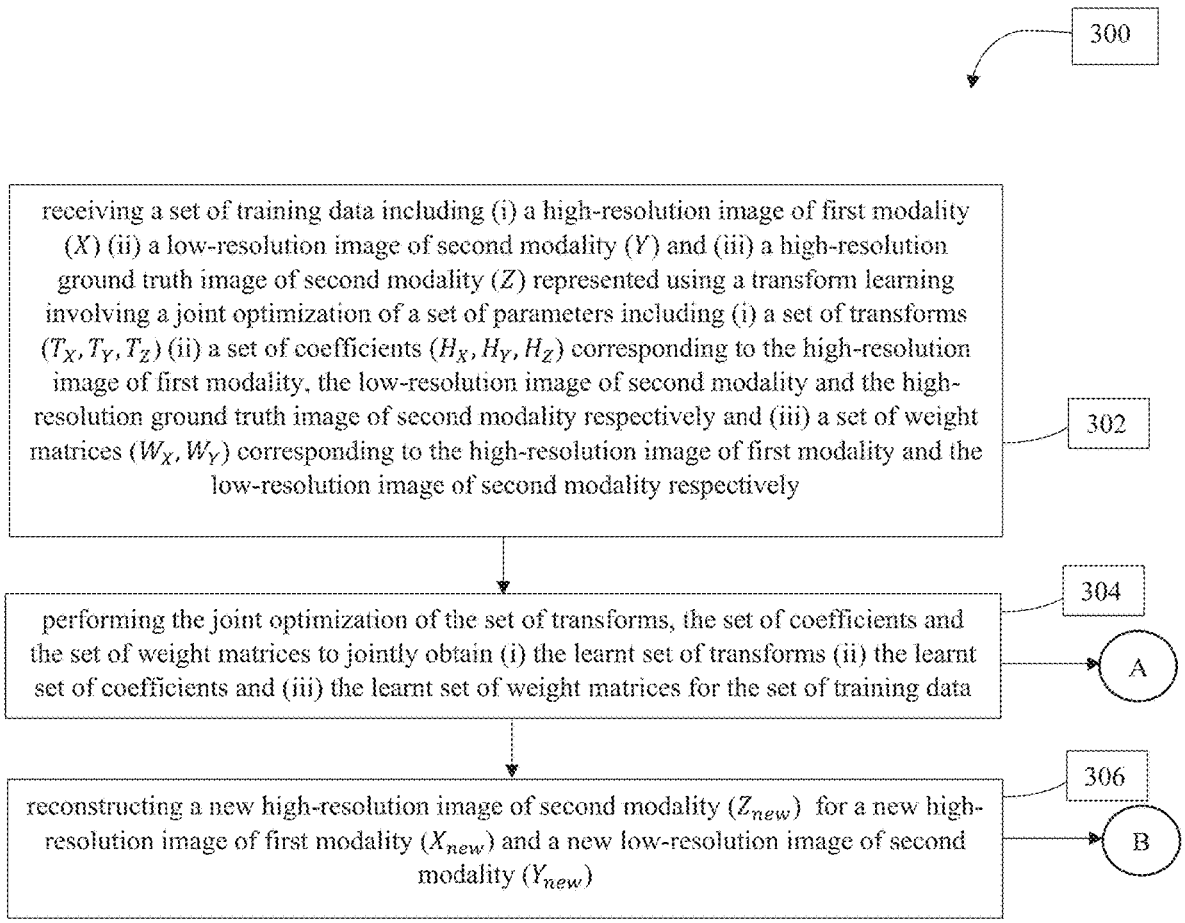
FIG. 3A through FIG. 3D is an exemplary flow diagram illustrating the method for multi-modal image super-resolution, according to some embodiments of the present disclosure.
Figure 3B:
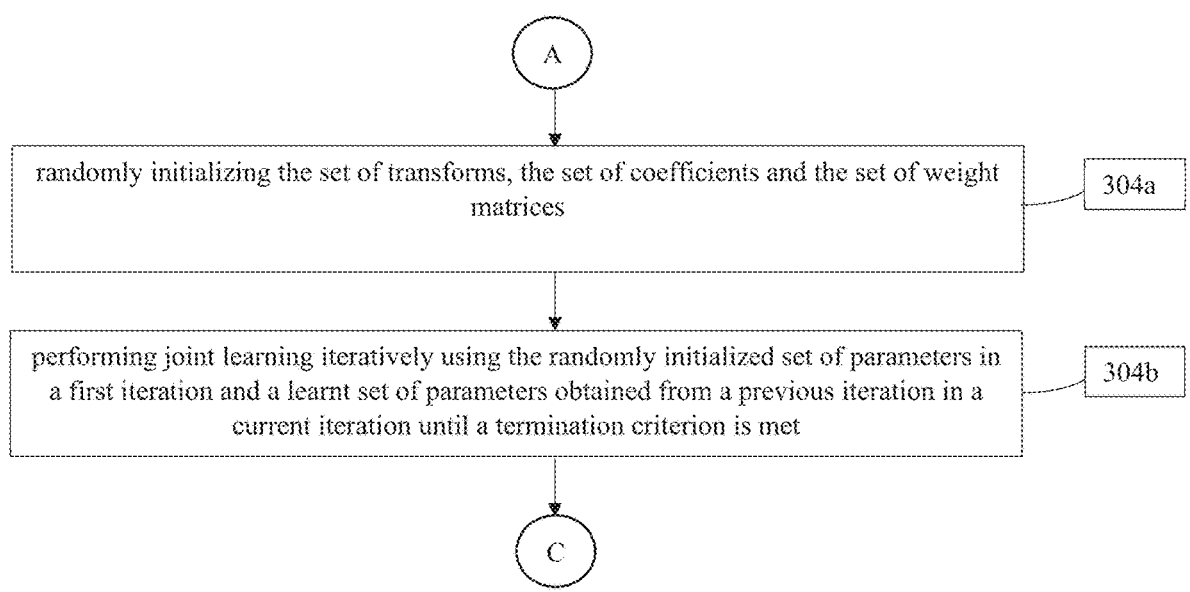
Figure 3C:
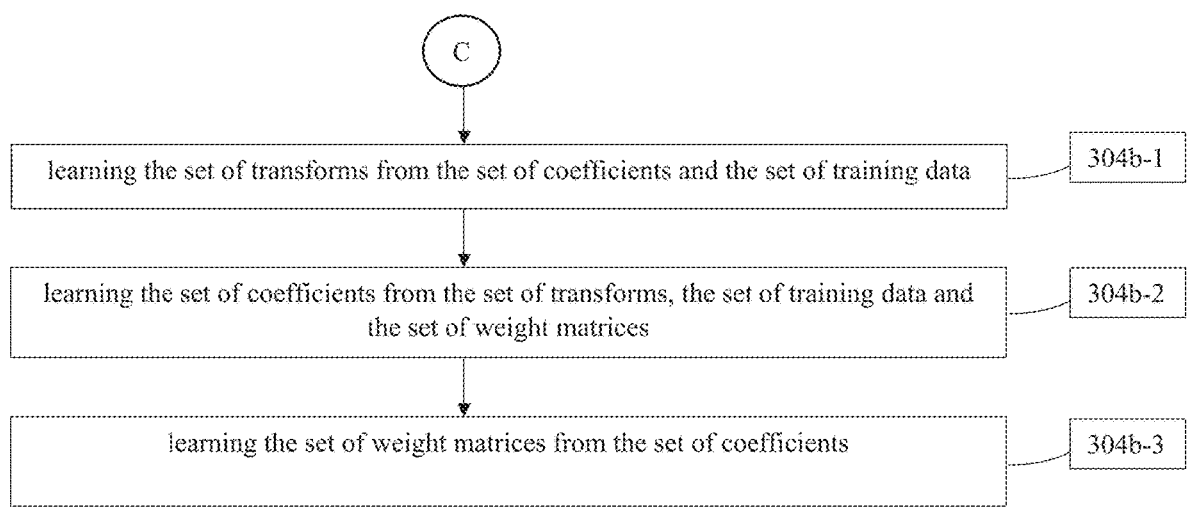
Figure 3D:
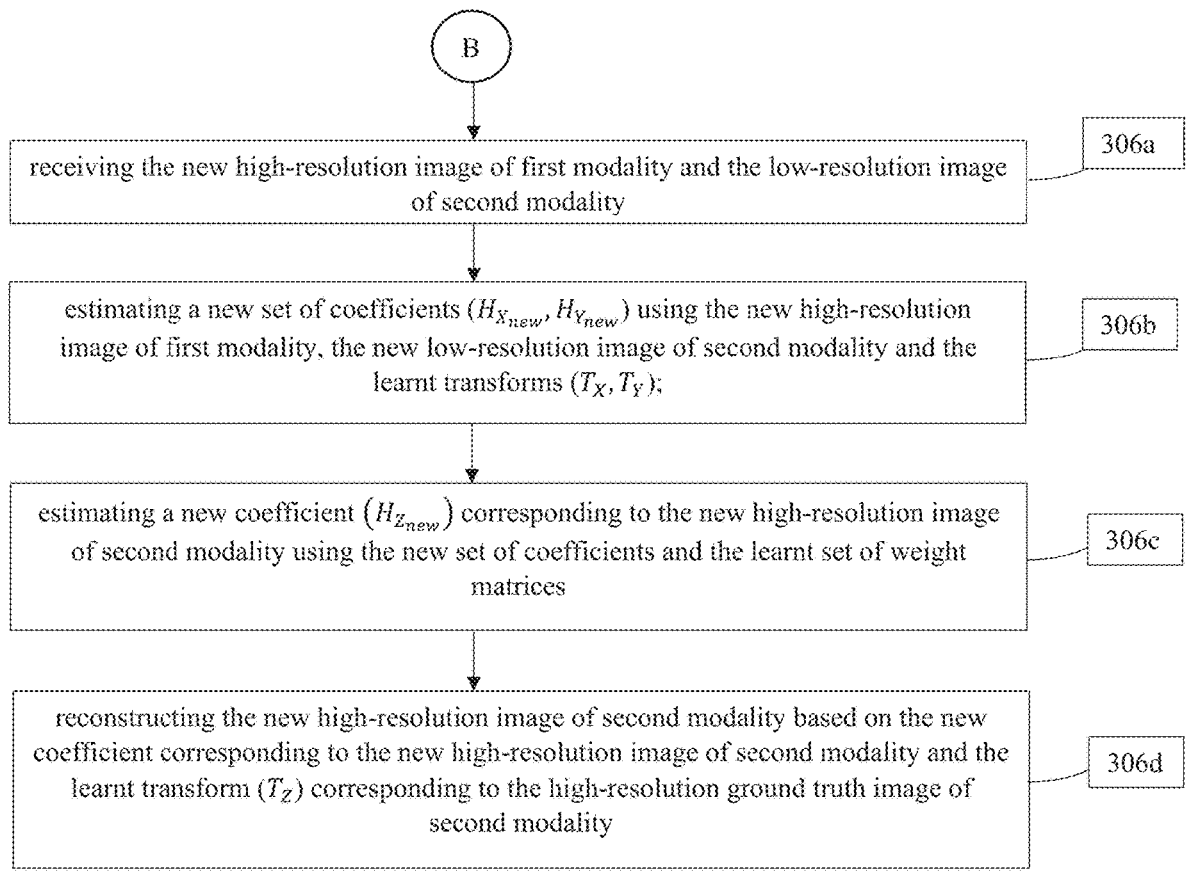

FIG. 3A through FIG. 3D is an exemplary flow diagram illustrating the method for multi-modal image super-resolution, according to some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 300 of the present disclosure will now be explained with reference to components of the system 100 of FIG. 1. FIG. 3A through FIG. 3C illustrates the training phase of the disclosed transform learning framework and FIG. 3D illustrates the testing phase of the disclosed transform learning framework.

Figure 4:
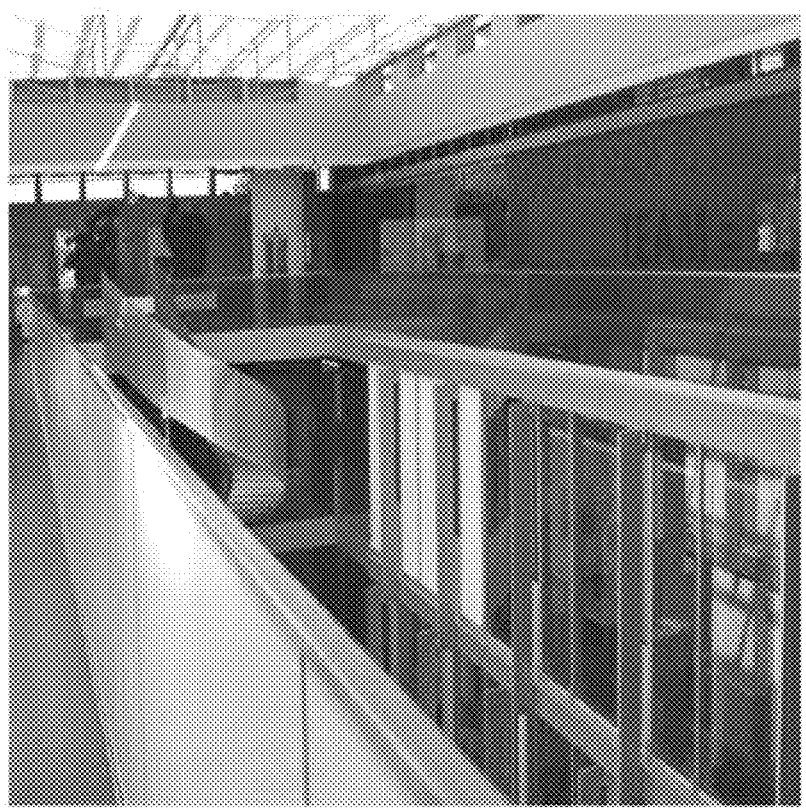
FIG. 4 is an example of a high-resolution image of guidance modality during the training phase and the testing phase for the method for multi-modal image super-resolution, according to some embodiments of the present disclosure.
Figure 5:
FIG. 5 is an example of a low-resolution image of target modality during the training phase and the testing phase for the method for multi-modal image super-resolution, according to some embodiments of the present disclosure.
Figure 6:
FIG. 6 is an example of a high-resolution image of target modality during the training phase for the method for multi-modal image super-resolution, according to some embodiments of the present disclosure.

In an embodiment of the present disclosure, the one or more processors 102 are configured to receive, at step 302 a set of training data. In an embodiment the set of training data include (i) a high-resolution image (X) of a first modality (ii) a low-resolution image (Y) of a second modality and (iii) a high-resolution ground truth image (Z) of the second modality. The training data is represented by using a transform learning involving a joint optimization of a set of parameters. The set of parameters include (i) a set of transforms ($T_X$, $T_Y$, $T_Z$) (ii) a set of coefficients ($H_X$, $H_Y$, $H_Z$) corresponding to the high-resolution image of the first modality, the low-resolution image of second modality and the high-resolution ground truth image of the second modality respectively and (iii) a set of weight matrices($W_X$, $W_Y$) corresponding to the high-resolution image of the first modality and the low-resolution image of the second modality respectively. The first modality corresponds to a guidance modality such as RGB image and the second modality corresponds to a target modality such as NIR/multispectral image. FIG. 4 is an example of a high-resolution image of the guidance modality during training phase and testing phase for the method for multi-modal image super-resolution, according to some embodiments of the present disclosure and FIG. 5 is an example of a low-resolution image of the target modality during training phase and testing phase for the method for multi-modal image super-resolution, according to some embodiments of the present disclosure. FIG. 6 is an example of a high-resolution image of the target modality during training phase for the method for multi-modal image super-resolution, according to some embodiments of the present disclosure.

In an embodiment of the present disclosure, the one or more processors 102 are configured to perform, at step 304 the joint optimization of the set of transforms, the set of coefficients and the set of weight matrices. The joint optimization of the set of parameters is expressed as $$\min_{T_X,T_Y,T_Z,H_X,H_Y,H_Z,W_X,W_Y} \|T_X X - H_X\|_F^2 + \|T_Y Y - H_Y\|_F^2 + \|T_Z Z - H_Z\|_F^2 + \lambda\left(\sum_{K \in X,Y,Z} \|H_K\|_1\right) + \eta\|H_Z - W_X H_X - W_Y H_Y\|_F^2 + \mu\left(\sum_{K \in X,Y,Z} (\|T_K\|_F^2 - \text{logdet}(T_K))\right) \quad (1)$$

wherein {X, Y, Z}∈ $\mathbb{R}^{N \times P}$, {$H_X$, $H_Y$, $H_Z$}∈ $\mathbb{R}^{N \times P}$ {$T_X$, $T_Y$, $T_Z$}∈ $\mathbb{R}^{N \times N}$, $W_X$, $W_Y$ ∈ $\mathbb{R}^{N \times N}$, $\lambda$, $\eta$ and $\mu$ are hyperparameters. N×P is the vectorized 2D image patch size. Given an image data matrix, X∈ $\mathbb{R}^{N \times P}$, N is the vectorized patch dimension and P is the total number of patches.

In an embodiment of the present disclosure, the joint optimization comprises initializing randomly the set of transforms, the set of coefficients and the weight matrices. In an embodiment the set of transforms, the set of coefficients and the weight matrices are randomly initialised at step 304a. The set of parameters are randomly initialized based on the size of matrices.

In an embodiment the joint learning is performed iteratively at step 304b using the randomly initialized set of parameters in a first iteration and a learnt set of parameters obtained from a previous iteration in a current iteration until a termination criterion is met. The joint learning comprises learning the set of transforms at step 304b-1 from the set of coefficients and the set of training data. The learning of set of transforms is represented as $$\min_{T_X} \|T_X X - H_X\|_F^2 + \mu(\|T_X\|_F^2 - \text{logdet}(T_X)) \quad (2)$$

$$\min_{T_Y} \|T_Y Y - H_Y\|_F^2 + \mu(\|T_Y\|_F^2 - \text{logdet}(T_Y))$$

$$\min_{T_Z} \|T_Z Z - H_Z\|_F^2 + \mu(\|T_Z\|_F^2 - \text{logdet}(T_Z))$$

The closed form update for $T_X$ is obtained using Cholesky decomposition $XX^T + \mu I = LL^T$ followed by SVD of $L^{-1}XH_X^T = Q\Sigma R^T$. The corresponding update equation for obtaining $T_X$ is given by, $$T_X = \frac{R}{2}\left(\Sigma + (\Sigma^2 + 2\mu I)^{1/2}\right)Q^T L^{-1} \quad (3)$$

Along similar lines the closed form updates for $T_Y$ and $T_Z$ are also derived.

Further the joint learning comprises learning the set of coefficients at step 304b-2 from the set of transforms, the set of training data and the set of weight matrices. The learning of the set of coefficients is represented as $$\min_{H_X} \|T_X X - H_X\|_F^2 + \lambda\|H_X\|_1 + \eta\|H_Z - W_X H_X - W_Y H_Y\|_F^2 \quad (4)$$

$$\min_{H_Y} \|T_Y Y - H_Y\|_F^2 + \lambda\|H_Y\|_1 + \eta\|H_Z - W_X H_X - W_Y H_Y\|_F^2$$

$$\min_{H_Z} \|T_Z Z - H_Z\|_F^2 + \lambda\|H_Z\|_1 + \eta\|H_Z - W_X H_X - W_Y H_Y\|_F^2$$

The closed form updates for the set of coefficients is derived by differentiating the equation 4 with respect to the corresponding variables and then equating to zero. Using basic matrix manipulation and soft thresholding. The closed form expressions can be written as:

$H_X = \text{sign}(A_X)*\max(0,|A_X|-B_X)$ $H_Y = \text{sign}(A_Y)*\max(0,|A_Y|-B_Y)$ $H_Z = \text{sign}(A_Z)*\max(0,|A_Z|-B_Z) \quad (5)$ where $$A_X = (I + \eta W'_X W_X)^{-1}(\eta W'_X(H_Z - W_Y H_Y) + T_X X),$$

$$B_X = (I + \eta(W'_X W_X))^{-1}\left(\frac{\lambda}{2}J\right),$$

$$A_Y = (I + \eta W'_Y W_Y)^{-1}(\eta W'_Y(H_Z - W_X H_X) + T_Y Y),$$

$$B_Y = (I + \eta(W'_Y W_Y))^{-1}\left(\frac{\lambda}{2}J\right),$$

$$A_Z = \frac{1}{1+\eta} * (\eta(W_X H_X + W_Y H_Y) + T_Z Z) \text{ and } B_Z = \frac{\lambda}{2(1+\eta)}J$$

where J denotes a matrix of all ones of N×P

Further the joint learning comprises learning the set of weight matrices at step 304b-3 from the set of coefficients. The learning of the set of weight matrices is represented as $$\min_{W_X} \|H_Z - W_X H_X - W_Y H_Y\|_F^2 \quad (6)$$

$$\min_{W_Y} \|H_Z - W_X H_X - W_Y H_Y\|_F^2$$

The closed form updates following the standard least square results is represented as $$W_X = (H_Z - W_Y H_Y) H_X^\dagger$$

$$W_Y = (H_Z - W_X H_X) H_Y^\dagger \quad (7)$$

Where † denotes pseudo inverse.

In accordance with an embodiment of the present disclosure, the termination criterion for the iterative learning is the difference between the set of parameters of a current iteration and the set of parameters of a previous iteration being less than an empirically determined threshold value. The empirically determined threshold value is 0.0001.

After obtaining the learnt set of parameters (i) the learnt set of transforms and (ii) the learnt set of weight matrices, using joint learning the one or more processors 102 are configured to reconstruct at step 306 a new high-resolution image of second modality ($Z_{new}$) for a new low-resolution image of second modality ($Y_{new}$) from a new high-resolution image of first modality ($X_{new}$) in an embodiment of the present disclosure.

In accordance to an embodiment of the present disclosure, the one or more processors 102 are configured to receive at step 306a the new high-resolution image of first modality and the low-resolution image of second modality. At step 306b a new set of coefficients ($H_{X_{new}}$, $H_{Y_{new}}$) is estimated using the new high-resolution image of first modality, the new low-resolution image of second modality and the learnt transforms ($T_X$, $T_Y$). The estimation of the new set of coefficients is represented as, $$\min_{H_{X_{new}}} \|T_X X_{new} - H_{X_{new}}\|_F^2 + \lambda \|H_{X_{new}}\|_1 \quad (8)$$

$$\min_{H_{Y_{new}}} \|T_Y Y_{new} - H_{Y_{new}}\|_F^2 + \lambda \|H_{Y_{new}}\|_1$$

The closed form update of $H_{X_{new}}$ is the standard expression for LASSO based optimization problems and the equation is given as below $$H_{X_{new}} = \text{sign}(T_X X_{new}) * \max\left(0, |T_X X_{new}| - \frac{\lambda}{2}\right) \quad (9)$$

Similar equations can be derived for $H_{Y_{new}}$ by having $Y_{new}$ as input.

Further at step 306c a new coefficient ($H_{Z_{new}}$) is estimated corresponding to the new high-resolution image of second modality using the new set of coefficients and the learnt set of weight matrices. The new coefficient corresponding to the new high-resolution image of second modality is represented as, $$H_{Z_{new}} = W_X H_{X_{new}} + W_Y H_{Y_{new}} \quad (10)$$

Figure 7:
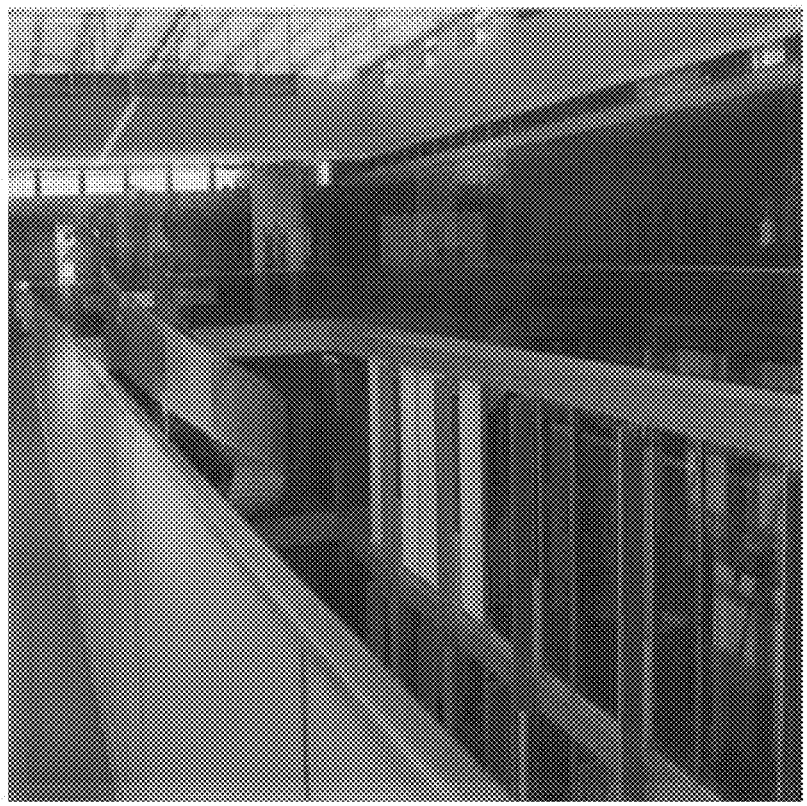
FIG. 7 is an example of a reconstructed high-resolution image of target modality using the method for multi-modal image super-resolution, according to some embodiments of the present disclosure.

At step 306d the new high-resolution image of second modality is reconstructed based on the new coefficient corresponding to the new high-resolution image of second modality and the learnt transform ($T_Z$) corresponding to the high-resolution ground truth image of second modality. FIG. 7 is an example image of a reconstructed high-resolution image of target modality using the method for multi-modal image super-resolution, according to some embodiments of the present disclosure.

The reconstructed new high-resolution image of second modality is represented as $$Z_{new} = T_Z^\dagger H_{Z_{new}} \quad (11)$$

EXPERIMENTAL RESULTS: The performance of the proposed method is compared on different multimodal datasets against the state-of-the-art MISR techniques. Two datasets are considered (i) RGB-NIR dataset (M. Brown and S. Susstrunk, '*Multispectral SIFT for scene category recognition*') and (ii) RGB-Multispectral dataset (A. Chakrabarti and T. Zickler, '*Statistics of Real-World Hyperspectral Images*'). The RGB image is taken as the guidance modality and NIR/Multispectral image is the target modality. Both the guidance and target images are of the same resolution. The LR image of the NIR/Multispectral image is generated by down sampling by a factor and then applying bicubic interpolation on this down sampled image by the same upscaling factor. In both the cases, the RGB image is converted to grayscale and this image is used as HR guidance image. Further, the images in the dataset are splitted for both training and testing phases.

In the training phase, three images containing HR image of RGB (X), LR image of NIR/Multispectral (Y) and HR image of NIR/Multispectral (Z) are chosen to learn the different model parameters. Different scaling factors are employed for generating the LR image in both the datasets. For the RGB/NIR dataset, an upscaling factor of 16 was considered and for RGB/Multispectral dataset an upscaling factor of 4 was taken. The images are truncated into patches of size 16×16 and hence the length of the vectorized patch size N is 256. The hyper parameters µ, λ and η were chosen using grid search and the values µ=10, λ=0:001 and η=100 are used.

Five different state-of-the-art techniques are considered for comparison. Out of these, three are based on joint image based filtering methods (JBF), guided image filtering (GF) and joint image restoration via scale map (JR), one based on deep learning (deep joint filtering (DJF)) and one on dictionary learning (coupled dictionary learning (CDL)). The methods have been implemented on both the multimodal datasets. The reconstruction accuracy of HR image of target modality is evaluated using Peak Signal to Noise Ratio (PSNR) and Structural Similarity Index (SSIM) metrics. Table 1 and 2 provides the results for 3 different test images taken from RGB/NIR and RGB/Multispectral datasets with upscaling factors of 16 and 4, respectively. The tables show that the proposed method is better in terms of both PSNR and SSIM and demonstrates better performance compared to the state-of-the-art techniques for MISR.

TABLE 1

RGB/NIR Dataset (16 up sampling factor)

| Method | Indoor04 | | Indoor10 | | Indoor21 | |
|---|---|---|---|---|---|---|
| | PSNR | SSIM | PSNR | SSIM | PSNR | SSIM |
| Proposed method | 28.003 | 0.895 | 25.797 | 0.893 | 26.783 | 0.874 |
| CDL | 26.858 | 0.902 | 25.002 | 0.837 | 26.112 | 0.850 |
| DL | 25.998 | 0.848 | 25.205 | 0.827 | 25.212 | 0.830 |
| JR | 23.465 | 0.862 | 22.782 | 0.848 | 22.066 | 0.809 |
| GF | 24.779 | 0.890 | 22.351 | 0.779 | 23.661 | 0.780 |
| JBF | 23.710 | 0.853 | 21.570 | 0.790 | 23.605 | 0.814 |

TABLE 2

RGB/Multispectral Dataset (4 up sampling factor)

| Method | Imge5 | | Imgf5 | | Imgh3 | |
|---|---|---|---|---|---|---|
| | PSNR | SSIM | PSNR | SSIM | PSNR | SSIM |
| Proposed method | 31.752 | 0.955 | 38.406 | 0.972 | 40.618 | 0.980 |
| CDL | 31.650 | 0.927 | 33.863 | 0.925 | 36.766 | 0.964 |
| DL | 26.971 | 0.941 | 32.639 | 0.927 | 30.783 | 0.936 |
| JR | 28.008 | 0.930 | 34.154 | 0.898 | 34.905 | 0.943 |
| GF | 31.152 | 0.876 | 34.821 | 0.950 | 38.143 | 0.971 |
| JBF | 31.096 | 0.901 | 34.962 | 0.958 | 37.274 | 0.969 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses problem of multimodal image super-resolution where a low-resolution image of a target modality is improved with the guidance of high-resolution image from another modality. The embodiments provide a novel joint optimization based transform learning framework wherein a high-resolution image of target modality is reconstructed from a HR image of guidance modality and a LR image of target modality. A set of parameters are learnt during training phase and these learnt set of parameters are used for reconstructing a HR image of target modality.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, via one or more hardware processors, a set of training data including (i) a high-resolution image of a first modality (X) (ii) a low-resolution image of a second modality (Y) and (iii) a high-resolution ground truth image of the second modality (Z) represented using a transform learning, wherein the first modality corresponds to a guidance modality comprising an RGB image, and the second modality corresponds to a target modality comprising one of Near-Infrared Imaging, NIR, and a multispectral image, and wherein the transform learning involving a joint optimization of a set of parameters including:
(i) a set of transforms ($T_X$, $T_Y$, $T_Z$) corresponding to the high-resolution image of the first modality, the low-resolution image of the second modality and the high-resolution ground truth image of the second modality respectively,
(ii) a set of coefficients ($H_X$, $H_Y$, $H_Z$) corresponding to the high-resolution image of the first modality, the low-resolution image of the second modality and the high-resolution ground truth image of the second modality respectively, and
(iii) a set of weight matrices ($W_X$, $W_Y$) corresponding to the high-resolution image of the first modality and the low-resolution image of the second modality respectively;
performing, via the one or more hardware processors, the joint optimization of the set of transforms, the set of coefficients and the set of weight matrices by:
randomly initializing the set of transforms, the set of coefficients and the set of weight matrices; and
performing joint learning iteratively using the randomly initialized set of parameters in a first iteration and a learnt set of parameters obtained from a previous iteration in a current iteration to jointly obtain (i) the learnt set of transforms (ii) the learnt set of coefficients and (iii) the learnt set of weight matrices for the set of training data, until a termination criterion is met,
wherein the joint learning comprises:
learning the set of transforms from the set of coefficients and the set of training data,
learning the set of coefficients from the set of transforms, the set of training data and the set of weight matrices, and
learning the set of weight matrices from the set of coefficients,
wherein the termination criterion is difference between the set of parameters of the current iteration and the set of parameters of the previous iteration being less than an empirically determined threshold value; and
reconstructing, via the one or more hardware processors, a new high-resolution image of the second modality ($Z_{new}$) for a new low-resolution image of the second modality ($Y_{new}$) from a new high-resolution image of the first modality ($X_{new}$), wherein the reconstructing of the high-resolution image of the second modality comprises:

receiving, via the one or more hardware processors, the new high-resolution image of the first modality and the new low-resolution image of the second modality;
estimating, via the one or more hardware processors, a new set of coefficients ($H_{X_{new}}$, $H_{Y_{new}}$) using the new high-resolution image of the first modality, the new low-resolution image of the second modality and the learnt set of transforms ($T_X$, $T_Y$);
estimating, via the one or more hardware processors, a new coefficient ($H_{Z_{new}}$) corresponding to the new high-resolution image of the second modality using the new set of coefficients and the learnt set of weight matrices; and
reconstructing, via the one or more hardware processors, the new high-resolution image of the second modality based on the new coefficient corresponding to the new high-resolution image of the second modality and the learnt set of transforms ($T_Z$) corresponding to the high-resolution ground truth image of the second modality,
wherein a resolution of the low-resolution image of the second modality (Y) is improved by reconstructing the new high-resolution image of the second modality using the new high-resolution image of first modality and the new low-resolution image of the second modality using the learnt set of transforms ($T_Z$), the learnt set of coefficients, and the learnt set of weight matrices.

2. The processor implemented method of claim 1, wherein the joint optimization is represented as:

$$\min_{T_X,T_Y,T_Z,H_X,H_Y,H_Z,W_X,W_Y} \|T_X X - H_X\|_F^2 +$$
$$\|T_Y Y - H_Y\|_F^2 + \|T_Z Z - H_Z\|_F^2 + \lambda \left( \sum_{K \in X,Y,Z} \|H_K\|_1 \right) +$$
$$\eta \|H_Z - W_X H_X - W_Y H_Y\|_F^2 + \mu \left( \sum_{K \in X,Y,Z} \left( \|T_K\|_F^2 - \text{logdet}(T_K) \right) \right)$$

wherein $\{X, Y, Z\} \in \mathbb{R}^{N \times P}$, $\{H_X, H_Y, H_Z\} \in \mathbb{R}^{N \times P}$, $\{T_X, T_Y, T_Z\} \in \mathbb{R}^{N \times N}$, $W_X, W_Y \in \mathbb{R}^{N \times N}$, $\lambda$, $\eta$, $\mu$ are hyperparameters and N×P is the vectorized 2D image patch size.

3. The processor implemented method of claim 1, wherein the learning of the set of transforms is represented as:

$$\min_{T_X} \|T_X X - H_X\|_F^2 + \mu \left( \|T_X\|_F^2 - \text{logdet}(T_X) \right)$$
$$\min_{T_Y} \|T_Y Y - H_Y\|_F^2 + \mu \left( \|T_Y\|_F^2 - \text{logdet}(T_Y) \right)$$
$$\min_{T_Z} \|T_Z Z - H_Z\|_F^2 + \mu \left( \|T_Z\|_F^2 - \text{logdet}(T_Z) \right).$$

4. The processor implemented method of claim 1, wherein the learning of the set of coefficients is represented as:

$$\min_{H_X} \|T_X X - H_X\|_F^2 + \lambda \|H_X\|_1 + \eta \|H_Z - W_X H_X - W_Y H_Y\|_F^2$$
$$\min_{H_Y} \|T_Y Y - H_Y\|_F^2 + \lambda \|H_Y\|_1 + \eta \|H_Z - W_X H_X - W_Y H_Y\|_F^2$$
$$\min_{H_Z} \|T_Z Z - H_Z\|_F^2 + \lambda \|H_Z\|_1 + \eta \|H_Z - W_X H_X - W_Y H_Y\|_F^2.$$

5. The processor implemented method of claim 1, wherein the learning of the set of weight matrices is represented as:

$$\min_{W_X} \|H_Z - W_X H_X - W_Y H_Y\|_F^2$$

$$\min_{W_Y} \|H_Z - W_X H_X - W_Y H_Y\|_F^2.$$

6. The processor implemented method of claim 1, wherein estimating the new set of coefficients is represented as:

$$\min_{H_{X_{new}}} \|T_X X_{new} - H_{X_{new}}\|_F^2 + \lambda \|H_{X_{new}}\|_1$$

$$\min_{H_{Y_{new}}} \|T_Y Y_{new} - H_{Y_{new}}\|_F^2 + \lambda \|H_{Y_{new}}\|_1.$$

7. The processor implemented method of claim 1, wherein estimating the new coefficient corresponding to the new high-resolution image of second modality is represented as:

$$H_{Z_{new}} = W_X H_{X_{new}} + W_Y H_{Y_{new}}.$$

8. The processor implemented method of claim 1, wherein reconstructing the new high-resolution image of second modality is represented as:

$$Z_{new} = T_Z^\dagger H_{Z_{new}}.$$

9. A system, comprising:
a memory storing instructions;
one or more communication interfaces; and
one or more hardware processors coupled to the memory via the one or more communication interfaces, wherein the one or more hardware processors are configured by the instructions to:
receive a set of training data including (i) a high-resolution image of a first modality (X) (ii) a low-resolution image of a second modality (Y) and (iii) a high-resolution ground truth image of the second modality (Z) represented using a transform learning, wherein the first modality corresponds to a guidance modality comprising an RGB image, and the second modality corresponds to a target modality comprising one of Near-Infrared Imaging, NIR, and a multispectral image, and wherein the transform learning involving a joint optimization of a set of parameters including:
(i) a set of transforms ($T_X$, $T_Y$, $T_Z$) corresponding to the high-resolution image of the first modality, the low-resolution image of the second modality and the high-resolution ground truth image of the second modality respectively,
(ii) a set of coefficients ($H_X$, $H_Y$, $H_Z$) corresponding to the high-resolution image of the first modality, the low-resolution image of the second modality and the high-resolution ground truth image of the second modality respectively, and
(iii) a set of weight matrices ($W_X$, $W_Y$) corresponding to the high-resolution image of the first modality and the low-resolution image of the second modality respectively;
perform the joint optimization of the set of transforms, the set of coefficients and the set of weight matrices by:
randomly initializing the set of transforms, the set of coefficients and the set of weight matrices; and
performing joint learning iteratively using the randomly initialized set of parameters in a first iteration and a learnt set of parameters obtained from a previous iteration in a current iteration to jointly obtain (i) the learnt set of transforms (ii) the learnt set of coefficients and (iii) the learnt set of weight matrices for the set of training data, until a termination criterion is met,
wherein the joint learning comprises:
learning the set of transforms from the set of coefficients and the set of training data,
learning the set of coefficients from the set of transforms, the set of training data and the set of weight matrices, and
learning the set of weight matrices from the set of coefficients,
wherein the termination criterion is difference between the set of parameters of the current iteration and the set of parameters of the previous iteration being less than an empirically determined threshold value; and
reconstruct a new high-resolution image of the second modality ($Z_{new}$) for a new low-resolution image of the second modality ($Y_{new}$) from a new high-resolution image of the first modality ($X_{new}$), wherein to reconstruct the high-resolution image of the second modality, the one or more hardware processors are configured by the instructions to:
receive the new high-resolution image of the first modality and the new low-resolution image of the second modality;
estimate a new set of coefficients ($H_{X_{new}}$, $H_{Y_{new}}$) using the new high-resolution image of the first modality, the new low-resolution image of the second modality and the learnt set of transforms ($T_X$, $T_Y$);
estimate a new coefficient ($H_{Z_{new}}$) corresponding to the new high-resolution image of the second modality using the new set of coefficients and the learnt set of weight matrices; and
reconstruct the new high-resolution image of the second modality based on the new coefficient corresponding to the new high-resolution image of the second modality and the learnt set of transforms ($T_Z$) corresponding to the high-resolution ground truth image of the second modality,
wherein a resolution of the low-resolution image of the second modality (Y) is improved by reconstructing the new high-resolution image of the second modality using the new high-resolution image of first modality and the new low-resolution image of the second modality using the learnt set of transforms ($T_Z$), the learnt set of coefficients, and the learnt set of weight matrices.

10. The system of claim 9, wherein the joint optimization is represented as:

$$\min_{T_X, T_Y, T_Z, H_X, H_Y, H_Z, W_X, W_Y} \|T_X X - H_X\|_F^2 +$$

$$\|T_Y Y - H_Y\|_F^2 + \|T_Z Z - H_Z\|_F^2 + \lambda \left( \sum_{K \in X,Y,Z} \|H_K\|_1 \right) +$$

$$\eta \|H_Z - W_X H_X - W_Y H_Y\|_F^2 + \mu \left( \sum_{K \in X,Y,Z} \left( \|T_K\|_F^2 - \operatorname{logdet}(T_K) \right) \right)$$

wherein $\{X, Y, Z\} \in \mathbb{R}^{N \times P}$, $\{H_X, H_Y, H_Z\} \in \mathbb{R}^{N \times P}$, $\{T_X, T_Y, T_Z\} \in \mathbb{R}^{N \times N}$, $W_X, W_Y \in \mathbb{R}^{N \times N}$, $\lambda, \eta, \mu$ are hyperparameters and N×P is the vectorized 2D image patch size.

11. The system of claim 9, wherein the learning of the set of transforms is represented as:

$$\min_{T_X} \|T_X X - H_X\|_F^2 + \mu(\|T_X\|_F^2 - \log\det(T_X))$$

$$\min_{T_Y} \|T_Y Y - H_Y\|_F^2 + \mu(\|T_Y\|_F^2 - \log\det(T_Y))$$

$$\min_{T_Z} \|T_Z Z - H_Z\|_F^2 + \mu(\|T_Z\|_F^2 - \log\det(T_Z)).$$

12. The system of claim 9, wherein the learning of the set of coefficients is represented as:

$$\min_{H_X} \|T_X X - H_X\|_F^2 + \lambda\|H_X\|_1 + \eta\|H_Z - W_X H_X - W_Y H_Y\|_F^2$$

$$\min_{H_Y} \|T_Y Y - H_Y\|_F^2 + \lambda\|H_Y\|_1 + \eta\|H_Z - W_X H_X - W_Y H_Y\|_F^2$$

$$\min_{H_Z} \|T_Z Z - H_Z\|_F^2 + \lambda\|H_Z\|_1 + \eta\|H_Z - W_X H_X - W_Y H_Y\|_F^2.$$

13. The system of claim 9, wherein the learning of the set of weight matrices is represented as:

$$\min_{W_X} \|H_Z - W_X H_X - W_Y H_Y\|_F^2$$

$$\min_{W_Y} \|H_Z - W_X H_X - W_Y H_Y\|_F^2.$$

14. The system of claim 9, wherein estimating the new set of coefficients is represented as:

$$\min_{H_{X_{new}}} \|T_X X_{new} - H_{X_{new}}\|_F^2 + \lambda\|H_{X_{new}}\|_1$$

$$\min_{H_{Y_{new}}} \|T_Y Y_{new} - H_{Y_{new}}\|_F^2 + \lambda\|H_{Y_{new}}\|_1.$$

15. The system of claim 9, wherein estimating the new coefficient corresponding to the new high-resolution image of second modality is represented as:

$$H_{Z_{new}} = W_X H_{X_{new}} + W_Y H_{Y_{new}}.$$

16. The system of claim 9, wherein reconstructing the new high-resolution image of second modality is represented as:

$$Z_{new} = T_Z^\dagger H_{Z_{new}}.$$

17. One or more non-transitory machine-readable information storage mediums comprising one or more instructions which when executed by one or more hardware processors cause:

receiving, a set of training data including (i) a high-resolution image of a first modality (X) (ii) a low-resolution image of a second modality (Y) and (iii) a high-resolution ground truth image of the second modality (Z) represented using a transform learning, wherein the first modality corresponds to a guidance modality comprising an RGB image, and the second modality corresponds to a target modality comprising one of Near-Infrared Imaging, NIR, and a multispectral image, and wherein the transform learning involving a joint optimization of a set of parameters including:

(i) a set of transforms ($T_X$, $T_Y$, $T_Z$) corresponding to the high-resolution image of the first modality, the low-resolution image of the second modality and the high-resolution ground truth image of the second modality respectively, (ii) a set of coefficients ($H_X$, $H_Y$, $H_Z$) corresponding to the high-resolution image of the first modality, the low-resolution image of the second modality and the high-resolution ground truth image of the second modality respectively, and (iii) a set of weight matrices ($W_X$, $W_Y$) corresponding to the high-resolution image of the first modality and the low-resolution image of the second modality respectively;

performing the joint optimization of the set of transforms, the set of coefficients and the set of weight matrices by:
  randomly initializing the set of transforms, the set of coefficients and the set of weight matrices; and
  performing joint learning iteratively using the randomly initialized set of parameters in a first iteration and a learnt set of parameters obtained from a previous iteration in a current iteration to jointly obtain (i) the learnt set of transforms (ii) the learnt set of coefficients and (iii) the learnt set of weight matrices for the set of training data, until a termination criterion is met,
  wherein the joint learning comprises:
    learning the set of transforms from the set of coefficients and the set of training data,
    learning the set of coefficients from the set of transforms, the set of training data and the set of weight matrices, and
    learning the set of weight matrices from the set of coefficients,
    wherein the termination criterion is difference between the set of parameters of the current iteration and the set of parameters of the previous iteration being less than an empirically determined threshold value; and reconstructing a new high-resolution image of the second modality ($Z_{new}$) for a new low-resolution image of the second modality ($Y_{new}$) from a new high-resolution image of the first modality ($X_{new}$), wherein the reconstructing of the high-resolution image of the second modality comprises:
  receiving the new high-resolution image of the first modality and the new low-resolution image of the second modality;
  estimating a new set of coefficients ($H_{X_{new}}$, $H_{Y_{new}}$) using the new high-resolution image of the first modality, the new low-resolution image of the second modality and the learnt set of transforms ($T_X$, $T_Y$);
  estimating a new coefficient ($H_{Z_{new}}$) corresponding to the new high-resolution image of the second modality using the new set of coefficients and the learnt set of weight matrices; and
  reconstructing the new high-resolution image of the second modality based on the new coefficient corresponding to the new high-resolution image of the second modality and the learnt set of transforms ($T_Z$) corresponding to the high-resolution ground truth image of the second modality, wherein a resolution of the low-resolution image of the second modality (Y) is improved by reconstructing the new high-resolution image of the second modality using the new high-resolution image of first modality and the new low-resolution image of the second modality using the learnt set of transforms ($T_Z$), the learnt set of coefficients, and the learnt set of weight matrices.

\* \* \* \* \*